(12) United States Patent
Kim et al.

(10) Patent No.: US 7,843,857 B2
(45) Date of Patent: Nov. 30, 2010

(54) SYSTEM FOR PROVIDING CONTEXT-AWARE SERVICE AND METHOD THEREOF

(75) Inventors: Kyung-Sook Kim, Daejeon (KR); Je-Hun Rhee, Daejeon (KR); Hyun-Seo Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1282 days.

(21) Appl. No.: 11/270,959

(22) Filed: Nov. 9, 2005

(65) Prior Publication Data

US 2006/0126601 A1 Jun. 15, 2006

(30) Foreign Application Priority Data

Dec. 11, 2004 (KR) ...................... 10-2004-0104611
Jun. 7, 2005 (KR) ...................... 10-2005-0048394

(51) Int. Cl.
*H04L 12/16* (2006.01)
(52) U.S. Cl. ...................................... 370/271; 370/352
(58) Field of Classification Search ....................... None
See application file for complete search history.

(56) References Cited

U.S. PATENT DOCUMENTS

| 7,395,336 | B1 * | 7/2008 | Santharam et al. | 709/227 |
|---|---|---|---|---|
| 7,475,140 | B2 * | 1/2009 | Requena | 709/225 |
| 7,493,390 | B2 * | 2/2009 | Bobde et al. | 709/224 |
| 2004/0128344 | A1 * | 7/2004 | Trossen | 709/203 |
| 2004/0255302 | A1 * | 12/2004 | Trossen | 719/318 |
| 2005/0114493 | A1 * | 5/2005 | Mandato et al. | 709/223 |
| 2005/0289097 | A1 * | 12/2005 | Trossen et al. | 707/1 |
| 2007/0060124 | A1 * | 3/2007 | Kalavade | 455/433 |

FOREIGN PATENT DOCUMENTS

EP 1439674 A2 7/2004

OTHER PUBLICATIONS

N. Priggouris, et al, "SIP-based Location Aware Services, 2002 International Conference on Software", Telecommunications and Computer Networks, Oct. 2002.
Dana Pavel, et al, "Context Provisioning and SIP Events", Nokia Research, 5 Wayside Road, Burlington, MA 01803, USA, 2004.

(Continued)

*Primary Examiner*—Jayanti K Patel
*Assistant Examiner*—Anthony Sol
(74) *Attorney, Agent, or Firm*—Blakely, Sokoloff, Taylor & Zafman (57) ABSTRACT

A context-aware service providing system according to an exemplary embodiment of the present invention includes a plurality of context-aware service providers and a Session Initiation Protocol (SIP) server. The context-aware service provider subscribes an SIP event for user context information based on subscriber information in the context-aware service. The SIP server manages information on the context-aware service provider (i.e., subscription requestor) and the context information obtained from the SIP event subscription request, obtains service terminal capabilities and context information of the user from SIP registration and SIP event publication of the user, and transmits SIP event notification including the context information of the user by selecting a context-aware service provider subscribing the SIP event corresponding to the context information obtained from the SIP registration and the SIP event publication.

10 Claims, 5 Drawing Sheets

OTHER PUBLICATIONS

Weil Li, "A Service Oriented SIP Infrastructure for Adaptive and Context-aware wireless services", Department of Computer and Systems Sciences Royal Institute of Technology, 2003.

Kyung Sook Kim, et al., "Method for Context Aware Service Using SIP", Cross and Converge: , Human Computer Interaction HCI 2005 Proceedings, pp. 898-902, Jan. 31, 2005, Abstract.

* cited by examiner

SYSTEM FOR PROVIDING CONTEXT-AWARE SERVICE AND METHOD THEREOF

CROSS-REFERENCE TO RELATED APPLICATION

This application claims priority to and the benefit of Korean Patent Application 10-2004-0104611 filed in the Korean Intellectual Property Office on Dec. 11, 2004, and 10-2005-0048394 filed in the Korean Intellectual Property Office on Jun. 7, 2005, the entire content of which is incorporated herein by reference.

BACKGROUND OF THE INVENTION (a) Field of the Invention

The present invention relates to a system for providing context-aware services and a method thereof.

(b) Description of the Related Art

Various additional services using the Internet are provided as the number of Internet users is increased and Internet services become popular. A Session Initiation Protocol (SIP) is an application layer control and signaling protocol for creating, modifying and terminating sessions with one or more participants. The SIP is widely used in multimedia session control and Internet telephone services.

The SIP supports user mobility by performing a session initiation through a physical contact corresponding to a user identifier (i.e., an SIP identifier) obtained from SIP registration even if a user location is changed to access a communication network or a user uses another service terminal. In further detail, the service terminal of the user transmits an SIP registration message having a contact header including physical contact information corresponding to the user SIP identifier, and an SIP server performs user SIP registration and stores the information in the contact header. Then, when receiving a service request message by the SIP identifier of the user, the SIP server supports the user mobility by transmitting the service request message to the corresponding physical contact.

According to an Internet Engineering Task Force request for comments (IETF RFC) 3840 indicating user agent capabilities in SIP, and capabilities and characteristic information about a user agent carried as parameters of the Contact header field within SIP registration request message. The capabilities and characteristics about a user agent include an ability to generate or process an audio/video service, particular type of message content and available languages and whether or not a user agent is a mobile and so on. In addition, an IETF SIMPLE Working Group suggested a rich presence extension to the presence information data (RPID) format which is a presence data format including information about what the person is doing, the type of place a person is in, the person's mood, the type of service it offers, and the overall role of the presentity.

Accordingly, services have been provided for a corresponding physical contact point by using the SIP registration information and by performing an SIP session negotiation on service terminal capabilities or services based on SIP presence have been provided.

A related approach is a paper entitled "SIP-based Location Aware Services" at "2002 International Conference on Software, Telecommunications and Computer Networks". In this paper, in order to provide a user location aware service which is one of the context-aware services by using the SIP, a service provider periodically transmits an INVITE request message to a single service terminal in order to obtain the location of service terminal, and provides the service based on geographical location of the service terminal which is obtained from IP address in a response message of the INVITE request message.

Recently, a range of computer usage has expanded from a personal computing area to a ubiquitous computing area as information industry and mobile communication technology have been developed. In the ubiquitous computing service, a terminal senses changes in their environment and automatically adapts and acts based on these changes based on user needs and preferences. Accordingly, services are required to adaptively vary according to a context including a present user location, and a user activity as well as service capabilities of service terminal in a ubiquitous computing environment.

The above information disclosed in this Background section is only for enhancement of understanding of the background of the invention and therefore it may contain information that does not form the prior art that is already known in this country to a person or ordinary skill in the art.

SUMMARY OF THE INVENTION

The present invention has been made in an effort to provide a context-aware service providing system for providing an adaptive service according to a user environment in a ubiquitous computing environment and a method thereof.

An exemplary context-aware service providing system according to an embodiment of the present invention includes a plurality of context-aware service providers and an SIP server. The plurality of context-aware service providers provides a service corresponding to respective contexts of a user by requesting a Session Initiation Protocol (SIP) subscription for user context information based on subscriber information in the context-aware service. The SIP server manages the context-aware service provider (i.e., a subscription requestor) information and context information obtained from the SIP event subscription, obtains service terminal capabilities and context information of the user by SIP registration and SIP event publication of the user, and transmits SIP event notification including the user context information by selecting a context-aware service provider subscribing the SIP event corresponding to the context information obtained by the SIP registration and the SIP event publication. In addition, the context-aware service provider receiving the SIP event notification from the SIP server selects a service corresponding to the user context information, and provides the service to the user through a service terminal corresponding to the service terminal capabilities.

In an exemplary context-aware service providing method providing a context-aware service in a ubiquitous computing environment by a system comprising a plurality of context-aware service providers subscribing a Session Initiation Protocol (SIP) event for user context information according to another embodiment of the present invention, an SIP registration request or an SIP deregistration request including service terminal capabilities and user context information is received (at this time, the SIP registration request and the SIP deregistration request transmitted when the user at a predetermined location logs on or logs off the service terminal), an SIP event publication including varied context information is received (at this time, the SIP event publication transmitted when the user context information is changed after the SIP registration), the service terminal capabilities and the context information of the user is obtained by the SIP registration request and the SIP event publication, a context-aware service provider subscribing the SIP event for the obtained context information is selected from the plurality of context-aware service providers, and the user context information is notified to the selected context-aware service provider so as to provide the context-aware service through a service terminal corresponding to the service terminal capabilities.

In a further embodiment, an exemplary Session Initiation Protocol (SIP) server for providing a location-based service and a context-aware service to a user through a service terminal in a ubiquitous computing environment, the SIP server includes an SIP basic module, a context information manager, and a context-aware service manager. The SIP basic module performs SIP registration and SIP deregistration of the user by SIP registration and SIP deregistration requests including user context information received from the service terminal, performs an SIP event subscription by an SIP event subscription request for the user context information received from a context-aware service provider, and performs an event publication received from the service terminal when the user context information is changed after the SIP registration. The context information manager manages the context information and current user logon/off information obtained from the SIP registration and the SIP deregistration. The context-aware service manager manages a list of the context-aware service providers, selects a context-aware service provider subscribing the SIP event for the context information obtained from the SIP registration and the SIP event publication, and notifies user context information to the selected context-aware service provider so as to provide a context-aware service to user.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. Like reference numerals designate like elements throughout the specification.

A context-aware service providing system and method thereof according to an exemplary embodiment of the present invention will be described.

Firstly, a context-aware service according to the exemplary embodiment of the present invention will be described with reference to FIG. 1.

Figure 1:
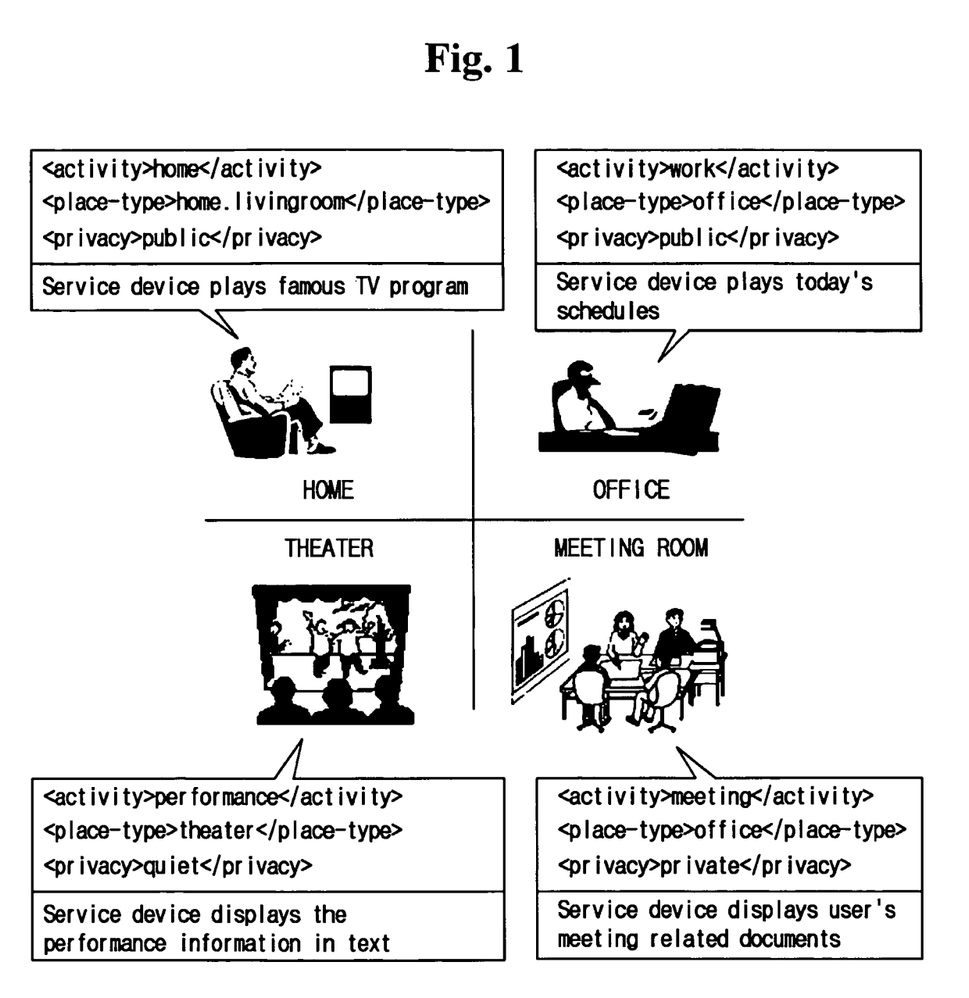
FIG. 1 shows a diagram for representing a context-aware service according to an exemplary embodiment of the present invention.

FIG. 1 shows a schematic diagram for representing a context-aware service according to context information including user activities and locations, in which a user environment is divided into a home HOME, an office OFFICE, a theater THEATER, and a meeting room MEETING ROOM.

As shown in FIG. 1, a service terminal plays a TV program for a user at rest when the service terminal senses the user in HOME environment, and the service terminal plays a work schedule formed by a moving picture for the user at work when the service terminal senses the user in OFFICE environment. The service terminal displays performance information formed by text for privacy when the user is watching a performance when the service terminal senses the user in THEATER environment, and the service terminal displays an exclusive document relating to a meeting for the user at the meeting when the service terminal senses the user in MEETING ROOM environment. The context information includes user privacy information so that the user may have privacy protection and determine a service range according to his needs.

As described, the context-aware service is for providing a flexible service according to the user context by sensing a user's location, a service terminal and user environment, and the user context which is frequently changed in the ubiquitous computing environment.

Next, the context-aware service providing system according to the exemplary embodiment of the present invention will be described with reference to FIG. 2.

Figure 2:
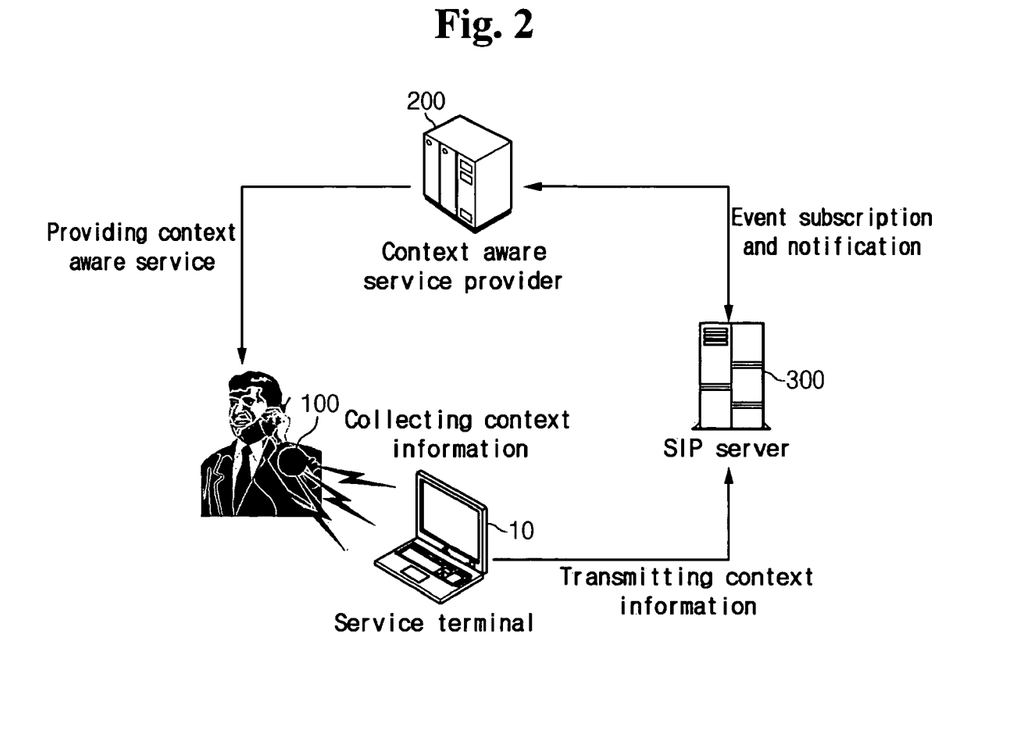
FIG. 2 shows a diagram of a configuration of a context-aware service providing system according to the exemplary embodiment of the present invention.

FIG. 2 shows a diagram of a configuration of the context-aware service providing system according to the exemplary embodiment of the present invention.

As shown in FIG. 2, the context-aware service providing system according to the exemplary embodiment of the present invention includes a user identifying unit 100, a plurality of context-aware service providers 200, and a Session Initiation Protocol (SIP) server 300. One context-aware service provider is illustrated in FIG. 2.

The user identifying unit 100 stores an SIP identifier for identifying a user so as to sense movement of the user. That is, a service terminal 10 senses the approach of a user by reading the user SIP identifier from the service terminal 10 at a predetermined location when the user enters the predetermined location. While a tag having the SIP identifier is used for the user identifying unit 100 in FIG. 2, various methods for sensing the user's location may be used. At this time, the service terminal according to the exemplary embodiment of the present invention senses a user's logon and logoff through the approach of a user tag, collects the user's context information and requests SIP registration to the SIP server 300 when sensing the user's logon, and transmits varied context information by an SIP event publication when the user context information varies after the SIP registration.

The context-aware service provider 200 manages context-aware service subscriber information, and requests an SIP event subscription to the SIP server 300 based on the context-aware service subscriber information including user and context of interest information. At this time, the context-aware service subscriber information may be inputted by the user or inputted through a web browser. When receiving an SIP event notification including the user context information by the SIP server, the context-aware service provider 200 selects a service appropriate for the user context and the service terminal capabilities, and provides the service to the service terminal. Then, the context-aware service provider 200 ends the service provided for the user when sensing the user's logoff by the SIP event notification.

The SIP server 300 performs the SIP event subscription by receiving the SIP event subscription request for the user context information from the context-aware service provider 200, performs the SIP registration for the user by receiving the SIP registration request from the service terminal 10, and performs the SIP event publication transmitted from the service terminal 10. At this time, when receiving the SIP registration request, an SIP deregistration request, or the SIP event publication from the service terminal 10 while obtaining the information on the subscription context and the context-aware service provider (i.e., a subscription requestor) from the SIP event subscription request and managing the obtained information on the subscription context and the context-aware service provider (i.e., a subscription requester), the SIP server 300 obtains information on the service terminal capabilities and user context, selects a context-aware service provider 200 subscribing to the obtained information, and transmits the user context information with the SIP event notification.

Figure 3:
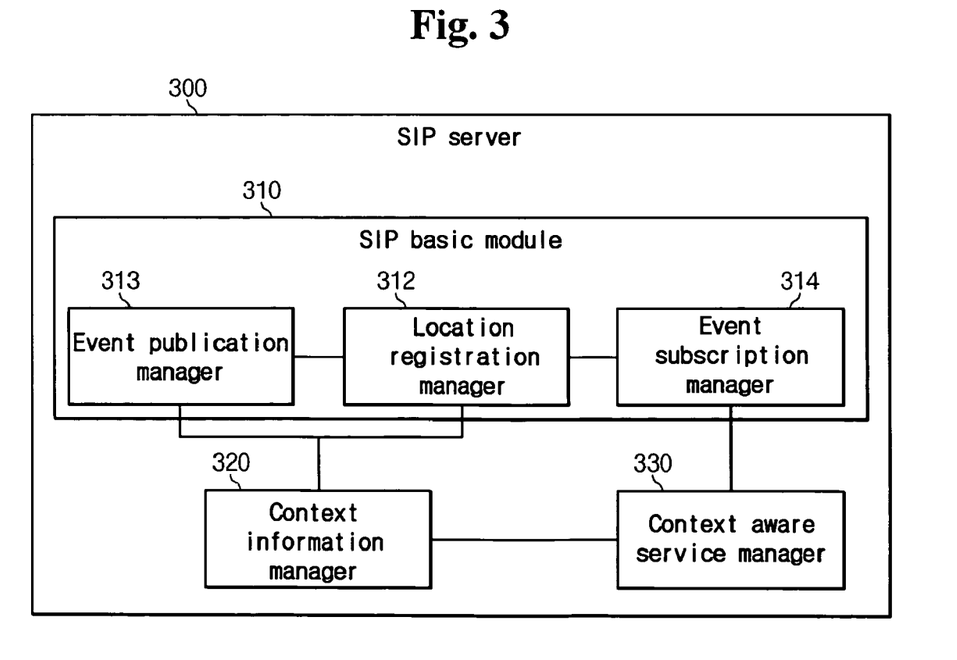
FIG. 3 shows a diagram of a configuration of a Session Initiation Protocol (SIP) server shown in FIG. 2.

FIG. 3 shows a diagram of a configuration of the SIP server shown in FIG. 2.

As shown in FIG. 3, the SIP server 300 includes an SIP basic module 310, a context information manager 320, and a context-aware service manager 330.

The SIP basic module 310 including a location registration manager 312, an event publication manager 313, and an event subscription manager 314 performs basic functions of the SIP server according to an SIP standard protocol including user SIP registration, SIP deregistration, and SIP call control.

When receiving an SIP registration message from the service terminal 10, the location registration manager 312 registers the user's location information when an Expires header value is not 0, and deregisters the user's location information when the Expires header value is 0. At this time, the location registration manager 312 transmits user logon information in a case of the location registration and transmits user logoff information in a case of the location deregistration, and transmits presence information and the service terminal capabilities in the SIP registration message to the context information manager 320. The service terminal capabilities following an Internet Engineering Task Force request for comments (IETF RFC) 3840 standard indicating user agent capabilities include a physical contact address of the user agent and an ability to generate or process an audio/video service, particular type of message content and available languages and whether or not a user agent is a mobile and so on. The service terminal capabilities are managed by the service terminal as a service terminal profile. The presence information includes information about the type of place a person is in, what the person is doing and user privacy as well as service terminal capabilities. The presence information may be used by extending a Rich Presence Extension to the Presence Information Data Format (RPID) of a presence data format proposed by an IETF SIMPLE Working Group. The service terminal may obtain the context information by various recognition technologies. The SIP registration message includes the context information and the presence information.

The event publication manager 313 processes the SIP event publication message received from the service terminal after the SIP registration, and transmits the user context information in the SIP event publication message to the context information manager 320.

The event subscription manager 314 processes the SIP event subscription and SIP event notification messages, transmits the information on the subscription context and the context-aware service provider (i.e., a subscription requester) to the context-aware service manager 330 when receiving the SIP event subscription request for the context of interest from the context-aware service provider 200, and transmits the SIP event notification message to the corresponding context-aware service provider 200 when new context information occurs from the context information manager 320.

The context information manager 320 manages user's current logon and logoff states. In addition, the context information manager 320 manages the service terminal capabilities and user context information including the user location and the activity by the presence information and the service terminal capabilities received from the location registration manager 312, and informs the context-aware service manager 330 of the new context information.

The context-aware service manager 330 manages a list of the context-aware service providers 200 requesting the SIP event subscription for the context of interest, and commands the event subscription manager 314 to transmit the notification message to a selected context-aware service provider 200 after selecting the corresponding context-aware service provider 200 by context filtering when the new context information occurs.

An operation of the context-aware service providing system according to the exemplary embodiment of the present invention will now be described with reference to FIG. 4 to FIG. 6.

Figure 4:
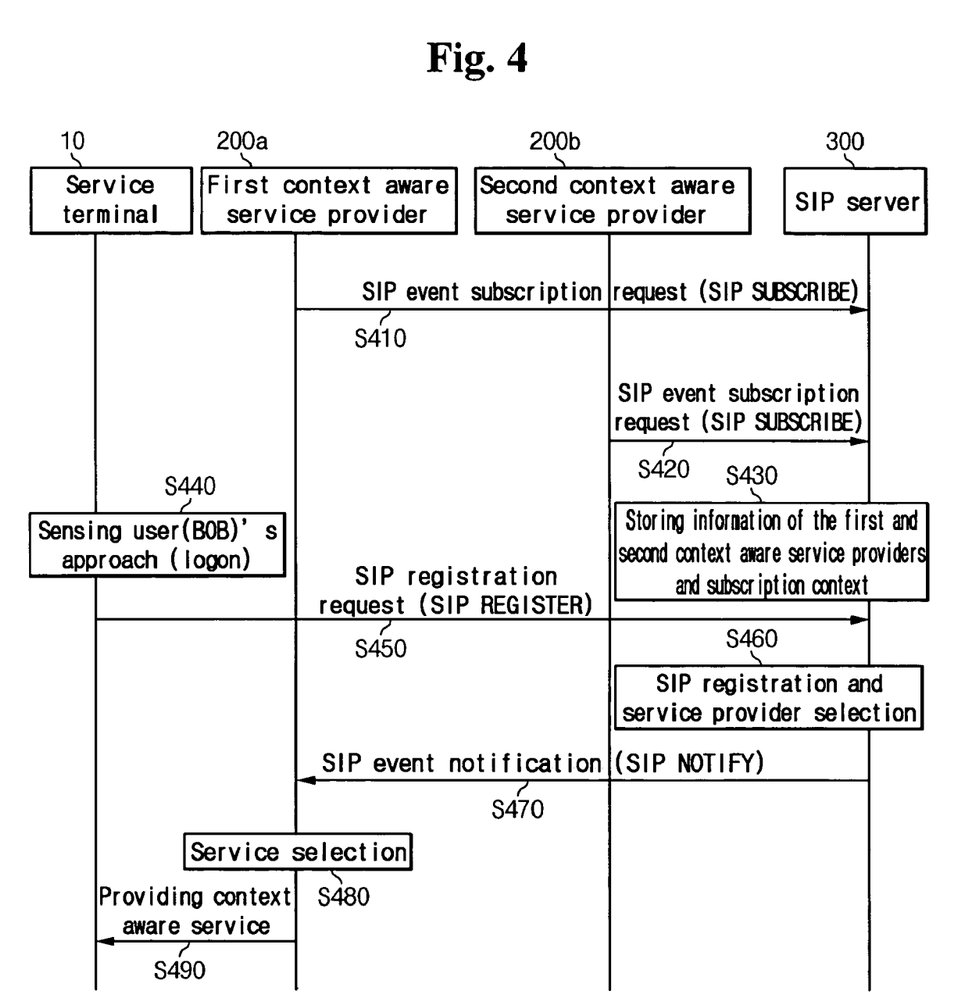
FIG. 4 to FIG. 6 show diagrams for representing operations of the context-aware service providing system according to first to third exemplary embodiments of the present invention.
Figure 5:
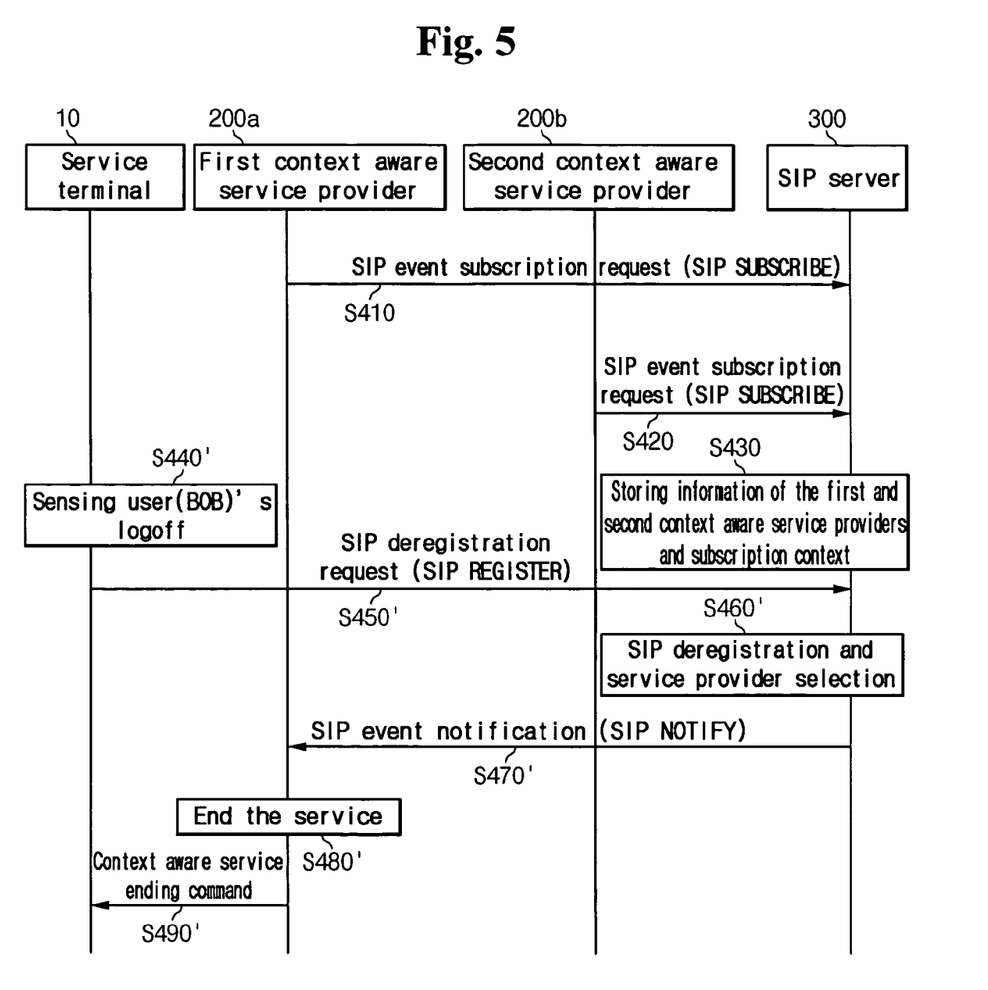

FIG. 4 shows a diagram for representing an operation of the context-aware service providing system when a user logs on the service terminal, and FIG. 5 shows a diagram for representing an operation of the context-aware service providing system when a user logs off the service terminal. FIG. 6 shows a diagram for representing an operation of the context-aware service providing system when the user context information is changed after the SIP registration. In FIG. 4 to FIG. 6, two context-aware service providers are illustrated, and are respectively denoted as first and second context-aware service providers 200a and 200b.

As shown in FIG. 4, the first context-aware service provider 200a, based on the service subscriber information, requests the SIP event subscription in step S410 to the SIP server 300 through the SIP event subscription message SIP SUBSCRIBE in a case that a user BOB is at a location LOCATION 1.

The second context-aware service provider 200b, based on the service subscriber information, requests the SIP event subscription in step S420 to the SIP server 300 through the SIP event subscription message SIP SUBSCRIBE in a case that a user BOB is at a location LOCATION 2 at work.

When receiving the SIP event subscription message SIP SUBSCRIBE from the first and second context-aware service providers 220a and 220b, the SIP server 300 processes the SIP event subscription, and stores the information of the first and second context-aware service providers 220a and 220b and each subscription context in step S430.

When sensing a user BOB logon by a tag of the user BOB in step S440, the service terminal at the location LOCATION 1 requests the SIP registration in step S450 to the SIP server 300 through the SIP registration message SIP REGISTER that includes the service terminal capabilities in the contact header and the context information including current user location information, the user activity and privacy obtained by various recognition in extended SIP presence data format.

When receiving the SIP registration message SIP REGISTER of the user BOB from the service terminal at the location LOCATION 1, the SIP server 300 performs the SIP registration, and obtains the context information from the SIP registration message in step S460. Then, the SIP server 300 selects the first context-aware service provider 200a subscribing the context information of the user BOB at the location LOCATION 1 from the obtained context information by context filtering, and notifies the context information of the user BOB to the first context-aware service provider 200a through the notification message SIP NOTIFY in step S470.

When receiving the SIP event notification message from the SIP server 300, the first context-aware service provider 200a selects an appropriate service for the user BOB according to the context information and the service terminal capabilities in step S480 after obtaining the context information and the service terminal capabilities of the user BOB from the SIP event notification message SIP NOTIFY, and provides the context-aware service to the service terminal in step S490.

As shown in FIG. 5, when sensing the user BOB logoff by the tag of the user BOB in step S440', the service terminal at the location LOCATION 1 requests the SIP deregistration to the SIP server 300 through the SIP deregistration message SIP REGISTER in step S450'.

When receiving the SIP deregistration message SIP REGISTER of the user BOB from the service terminal at the location LOCATION 1, the SIP server 300 performs the SIP deregistration, and obtains the context information from the SIP deregistration message SIP REGISTER in step S460'. Then, the SIP server 300 selects the first context-aware service provider 200a subscribing the context information of the user BOB at the location LOCATION 1, and notifies the context information of the user BOB to the first context-aware service provider 200a through the notification message SIP NOTIFY in step S470'. At this time, the first context-aware service provider 200a is selected from the obtained context information by context filtering.

When receiving the SIP event notification message SIP NOTIFY including the context information on the user BOB logoff from the SIP server 300, the first context-aware service provider 200a ends the context-aware service for the user BOB in step S408', and commands the service terminal at the location LOCATION 1 to end the context-aware service S490'.

Figure 6:
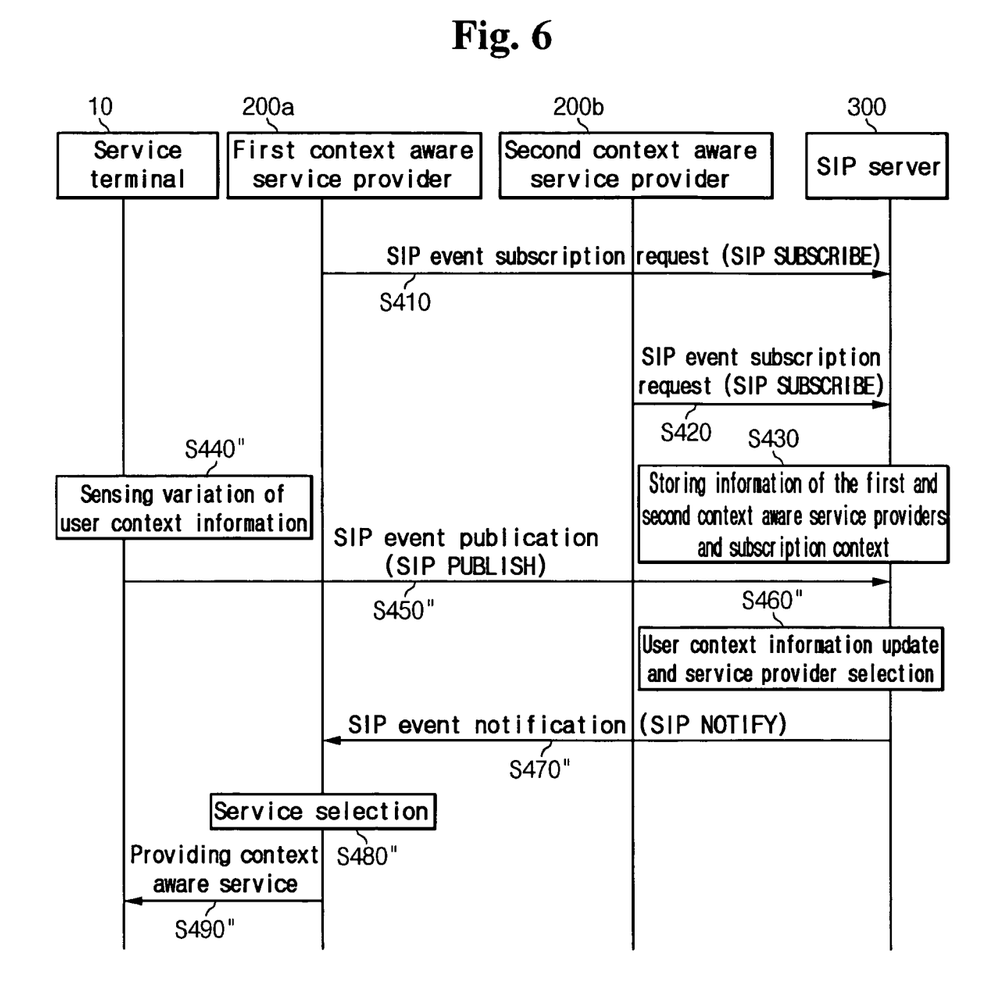

As shown in FIG. 6, when sensing variation of the context information of the user BOB in step S440'', the service terminal 10 at the location LOCATION 1 publishes the SIP event to the SIP server 300 through the SIP event publication message SIP PUBLISH including the varied information on the service terminal capabilities and user presence information in step S450''.

When receiving the SIP event publication message SIP PUBLISH of the user BOB from the service terminal at the location LOCATION 1, the SIP server 300 obtains the context information from the SIP event publication message SIP PUBLISH, updates the context information of the user, and selects the first context-aware service provider 200a subscribing the context information of the user BOB at the location LOCATION 1 from the obtained context information by context filtering in step S460''. The SIP server 300 notifies the varied context information of the user BOB to the selected first context-aware service provider 200a through the SIP event notification message SIP NOTIFY in step S470''.

When receiving the SIP event notification message from the SIP server 300, the first context-aware service provider 200a selects an appropriate service for the user BOB according to the context information and the service terminal capabilities in step S480'' after obtaining the varied context information and the service terminal capabilities of the user BOB from the SIP event notification message SIP NOTIFY, and provides the context-aware service to the service terminal S490''.

As described above, the present invention provides the context-aware service including the context information on the service terminal capabilities, location, activity, and privacy of the user by using the SIP. In addition, the user may determine service range and have privacy protection by adding the user privacy information to the context information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A context-aware service providing system providing a context-aware service to a user in a ubiquitous computing environment, the system comprising:

a plurality of context-aware service providers for providing a service corresponding to respective contexts of a user by requesting a Session Initiation Protocol (SIP) subscription for user context information based on subscriber information in the context-aware service, said context information including a present user location; and an SIP server for managing context-aware service provider information and context information obtained from a SIP event subscription, obtaining service terminal capabilities and said context information of the user by SIP registration and SIP event publication of the user, and transmitting SIP event notification including the user context information by selecting a context-aware service provider subscribing the SIP event corresponding to the user context information obtained by the SIP registration and the SIP event publication, wherein the context-aware service provider receiving the SIP event notification from the SIP server selects a service corresponding to the user context information including the present user location, and provides the service to the user through a service terminal corresponding to the service terminal capabilities and the provided service adaptively varies based on the user context information including the present user location, wherein the SIP server includes:

an SIP basic module for performing SIP registration and SIP deregistration of the user by SIP registration and SIP deregistration requests;

a context information manager for managing the context information and current user logon/off information corresponding to the SIP registration and the SIP deregistration; and a context-aware service manager for managing a list of the context-aware service providers, wherein the SIP basic module includes:

a location registration manager for obtaining the user context information from the SIP registration request and providing the obtained user context information to the context information manager;

an event publication manager for obtaining user context information from the SIP event publication of the user, and transmitting the user context information to the context information manager; and an event subscription manager for transmitting information on the context-aware service provider and subscription information obtained from the SIP event subscription request to the context-aware service manager, and providing the user context information to the context-aware service provider.

2. The context-aware service providing system of claim 1, further comprising a user identifying unit storing a user identifier for sensing movement of the user, wherein the service terminal senses a user location by communication with the user identifying unit, and obtains the context information of the user.

3. The context-aware service providing system of claim 2, wherein the service terminal requests the SIP registration and SIP deregistration to the SIP server through an SIP registration message including a contact header having the service terminal capabilities and the extended SIP presence data format having the user context information.

4. The context-aware service providing system of claim 2, wherein the service terminal performs the SIP event publication including the service terminal capabilities and the user presence information having varied context when the user context information is changed after the SIP registration of the user.

5. The context-aware service providing system of one of claim 1 to claim 4, wherein the context information includes information on at least one of location, activity, and privacy.

6. A method for providing a context-aware service in a ubiquitous computing environment by a system comprising a plurality of context-aware service providers subscribing a Session Initiation Protocol (SIP) event for user context information, the method comprising:
receiving an SIP registration request or an SIP deregistration request including service terminal capabilities and user context information, said context information including a present user location, the SIP registration request and the SIP deregistration request transmitted when the user at a predetermined location logs on or logs off the service terminal;
receiving an SIP event publication including varied context information, the SIP event publication transmitted when the user context information is changed after the SIP registration;
obtaining the service terminal capabilities and the context information of the user by the SIP registration request and the SIP event publication;
selecting a context-aware service provider subscribing the SIP event for the obtained context information among the plurality of context-aware service providers;
notifying the user context information to the selected context-aware service provider so as to provide the context-aware service through a service terminal corresponding to the service terminal capabilities, wherein the provided service adaptively varies based on the user context information including the present user location,
managing a list of the context-aware service providers,
obtaining the user context information from the SIP registration request and providing the obtained user context information to a context information manager;
obtaining user context information from the SIP event publication of the user, and transmitting the user context information to the context information manager; and
transmitting information on the context-aware service provider and subscription information obtained from the SIP event subscription request to the context-aware service manager; and providing the user context information to the context-aware service provider.

7. The method of claim 6, further comprising
obtaining, storing, and managing information on the plurality of context-aware service providers and the context information obtained from the SIP event subscriptions respectively requested from the plurality of context-aware service providers.

8. The method of claim 6 or claim 7, further comprising:
obtaining the service terminal capabilities and the context information from the SIP deregistration of the user;
selecting a context-aware service provider subscribing the SIP event for the obtained context information among the plurality of context-aware service providers;
and notifying the context information including user logoff information to the selected context-aware service provider so as to end the service being provided to the user.

9. A Session Initiation Protocol (SIP) server for providing a location-based service and a context-aware service to a user through a service terminal in a ubiquitous computing environment, the SIP server comprising:
an SIP basic module for performing SIP registration and SIP deregistration of the user by SIP registration and SIP deregistration requests including user context information obtained from the service terminal, said context information including a present user location, performing an SIP event subscription by an SIP event subscription request for the user context information received from a context-aware service provider, and performing an event publication received from the service terminal when the user context information is changed after the SIP registration;
a context information manager for managing the context information and current user logon/off information corresponding to the SIP registration and the SIP deregistration; and
a context-aware service manager for managing a list of the context-aware service providers, selecting a context-aware service provider subscribing the SIP event for the context information obtained from the SIP registration and the SIP event publication, and notifying the user context information to the selected context-aware service provider to provide a context-aware service and the provided service adaptively varies based on the user context information including the present user location,
wherein the context information includes user logon/off information and user contact information including service terminal capabilities, and presence information including user location information, activity information, and privacy information,
wherein the SIP basic module comprises:
a location registration manager for obtaining the user context information from the SIP registration request and notifying the obtained user context information to the context information manager;
an event publication manager for obtaining user context information from the SIP event publication of the user, and transmitting the user context information to the context information manager; and
an event subscription manager for transmitting information on the context-aware service provider and subscription information obtained from the SIP event subscription request to the context-aware service manager, and notifying the user context information to the context-aware service provider subscribing the SIP event for the user context information received from the context information manager.

10. The SIP server of claim of 9, wherein the location registration manager performs the SIP registration or the SIP deregistration of the user based on an Expires header value of the SIP registration message.

* * * * *